Feb. 6, 1962     N. LENARDON ETAL     3,019,815
VALVE
Filed July 15, 1959
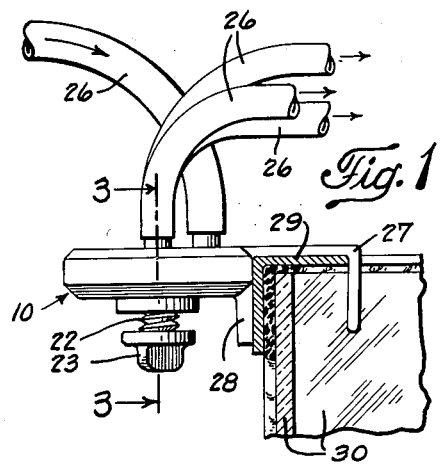
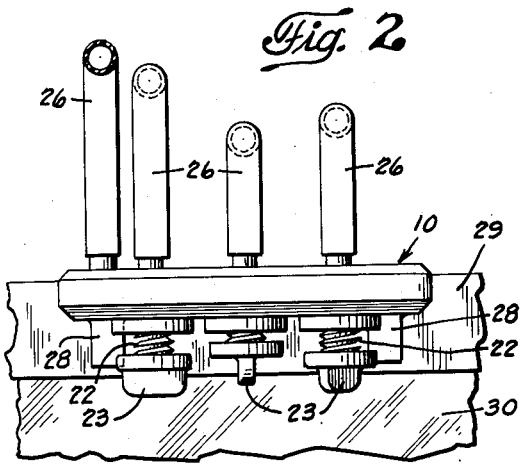
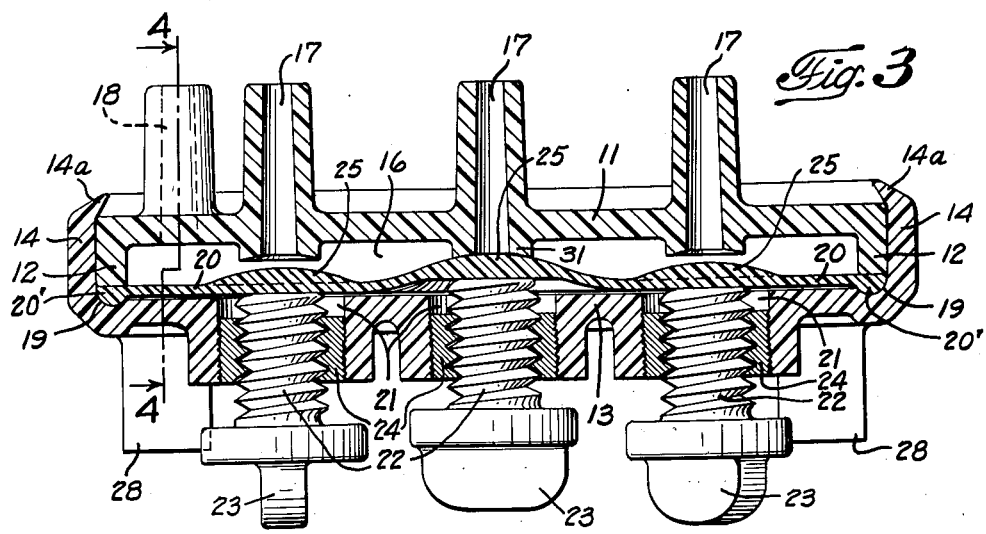
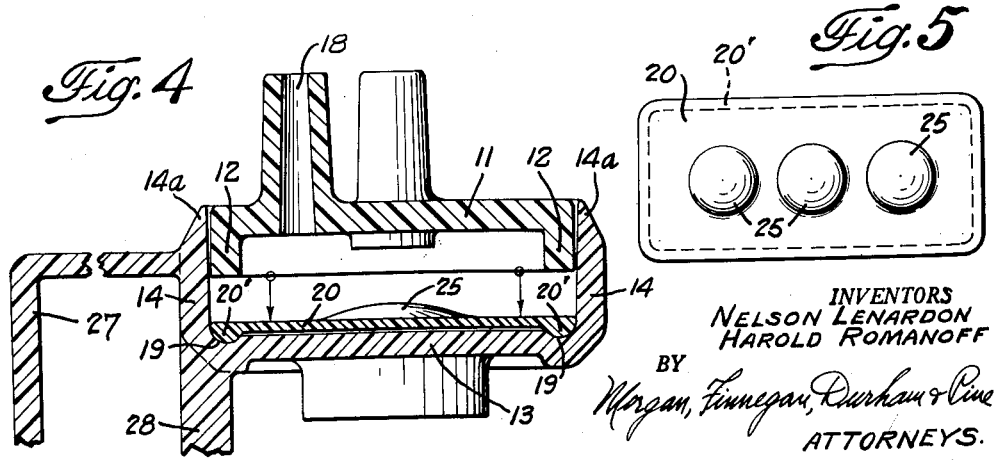
INVENTORS
NELSON LENARDON
HAROLD ROMANOFF
BY
Morgan, Finnegan, Durham & Pine
ATTORNEYS.

United States Patent Office 3,019,815
Patented Feb. 6, 1962

3,019,815
VALVE
Nelson Lenardon, New York, and Harold Romanoff, Scarsdale, N.Y., assignors to Saxon Plastics Corp., New York, N.Y., a corporation of New York
Filed July 15, 1959, Ser. No. 827,394
3 Claims. (Cl. 137—612.1)

This invention relates to valves for controlling the passage of fluids through multiple outlets, and particularly to such valves for controlling the passage of air into aquarium tanks kept in the home. The invention more particularly relates to such valves constructed for independent control of the air outlets.

In many valve applications it is desirable to use a valve construction having multiple outlets for controlled passage of fluids from one or more of the outlets independently of the others. Such constructions permit a more refined variation in the total volume of fluid discharged than in the case of constructions with but a single outlet. This is particularly evident in applications involving the controlled discharge of relatively small quantities of fluid, e.g., the discharge of air into home aquarium tanks.

A frequent practice in the art, in constructing multiple outlet valves, is to simply aggregate a number of unitary valve structures by interconnecting tubes and passageways. In addition to the obvious disadvantage of increased expense due to multiplication of parts, the interconnecting tubes and passageways in such structures increase the number of the points and areas of potential leakage. In order to provide reasonable insurance against such leaks, the tubes and passageways and the complementary portions of the valve bodies must be manufactured with small tolerances and expensive gaskets, etc. Such constructions are too costly for many applications and require excessive space. In addition, the number of moving parts in such aggregative structures is multiplied by the number of unitary valves used with consequent increase in the hazard of leaks due to wear. Some efforts have been made to overcome these disadvantages by designing the valve with outlets working off of one passageway. However, in these instances the requirement of close tolerances precludes the use of inexpensive plastic materials and molding practices, and frequently the closing of one outlet renders the others inoperative.

The above disadvantages and difficulties are obviated by the present invention. The present invention contemplates a structure having a number of fluid outlets permitting independent control of fluid discharge through each outlet independent of discharge through the other outlets. There are no interconnecting tubes or passageways. The number of moving parts is substantially reduced and these parts are associated with one another in such a way that possible wear with each is substantially decreased. Moreover, the wear is localized in areas where it cannot cause a leak. The device is simple to manufacture without close tolerances. It can be made almost entirely of inexpensive plastic materials and with inexpensive plastic molding processes. Embodiments of the invention may be made of small proportions so that space requirements are no problem in connection with the use of the invention.

Briefly, this is accomplished by providing a valve body having top and bottom and side walls to form an internal chamber to accommodate the fluid to be discharged. A plurality of spaced orifices are provided in the top of the valve body communicating from the fluid chamber to the outside of the valve body as fluid outlets. An additional orifice is provided in the top of the valve body spaced from the air outlet orifices and communicating from the outside of the valve body to the chamber to form a fluid inlet. A flat deformable diaphragm is positioned inside the chamber adjacent the bottom thereof spaced from the orifices and it has a size and shape to cover the bottom of the chamber. This diaphragm is secured at its edges in sealing engagement with the valve body inside the chamber to seal off the remainder of the chamber from the bottom thereof and to resist movement of the diaphragm as an entirety. The bottom of the valve body has a plurality of openings equal in number to the orifices forming fluid outlets and these openings are positioned in registry with the fluid outlet orifices. The openings communicate between the chamber below the diaphragm to outside the valve body. A stem is mounted in each opening in engagement with the bottom of the valve body to extend through the opening with its outer end outside the valve body, each stem being adjustable for movement of its other end to and from engagement with the diaphragm to deform said portion of the diaphragm into sealing engagement with a fluid outlet orifice independent of the remainder of the diaphragm and the other stems. And, an operating handle is provided on the outer end of each stem outside the valve body to facilitate adjustment movement of the stem.

Preferably, the diaphragm has local surfaces projecting toward the top of the chamber which are equal in number to the fluid outlet orifices and positioned in registry therewith to facilitate sealing engagement. More preferably, the top of the valve body surrounding the internal end of the fluid outlet orifices has projecting surfaces complementary to the projecting surfaces of the diaphragm to receive the projecting surfaces of the diaphragm during sealing engagement. Still more preferably, the stems are in threaded engagement with the bottom of the valve body for more precise adjustment of the sealing movement of the stems.

A preferred embodiment of the invention is illustrated by way of example in the accompanying drawings.

In the drawings:

FIGURE 1 is an end elevation of a typical embodiment of the invention mounted on a home aquarium tank, only a portion of the tank being shown;

FIGURE 2 is a side elevation of the illustrative embodiment of the invention similar to FIGURE 1 but looking at FIGURE 1 from the left;

FIGURE 3 is a longitudinal vertical section view taken on line 3—3 of FIGURE 1;

FIGURE 4 is a fragmentary section view taken on line 4—4 of FIGURE 3 showing the illustrative embodiment of the invention during the act of assembling the parts thereof; and FIGURE 5 is a plan view of the diaphragm which is an element of the invention.

Referring now more particularly to the typical embodiment of the invention shown by illustration in the drawings, the reference character 10 generally designates the body of the valve, which is comprised of two parts. The first part, here an upper part, has a flat top or plane portion 11 with four depending side walls 12 forming a well. The second part, here a lower part, of the valve body has a plane portion or bottom 13 which is slightly larger than the top 11 of the upper part, and the bottom 13 has four upwardly extending side walls 14 to receive and tightly engage the depending side walls 12 of the upper part when the upper part is inserted into the lower part. As illustrated most clearly in FIGURE 4, which shows partial assembly of the parts, the side walls 14 of the lower part flare slightly outwardly so that insertion of the upper part in the lower part causes an interference fit.

When the upper part of the valve body is fully inserted into the lower part, as illustrated in FIGURE 3, the well of the upper part and the bottom of the lower part form a hollow chamber, hereinafter called the fluid chamber 16.

The top 11 of the upper part has three orifices 17 spaced from one another and communicating from the fluid chamber 16 to the outside of the valve body. These orifices hereinafter will be referred to as fluid outlet orifices. The top 11 also has an additional orifice 18, which is spaced from the fluid outlet orifices 17, and it communicates from the outside of the valve body to the fluid chamber as a fluid inlet.

The bottom 13 of the lower part of the valve body is substantially flat except for a small recess 19 provided around its periphery.

A diaphragm 20, made of resilient and deformable polyethylene or rubber or the like, is positioned within the fluid chamber and has a size and shape to cover the bottom 13 of the lower part of the valve body. The element 20 has a peripheral ridge 20' complementary to the recess 19. The diaphragm 20 is positioned adjacent the bottom with its ridge 20' in the recess 19, so that the diaphragm lies closely adjacent the bottom 13 with its edge portions between the recess 19 of the lower part of the valve body and the side walls 12 of the upper part of the valve body. Consequently, when the upper part of the valve body is firmly pressed downwardly with its side walls in a snug interference fit engagement with the side walls 14 of the lower part, it presses the peripheral edges of the diaphragm downwardly to seal off the fluid chamber from the outside of the valve body. The fluid chamber, thusly, is also sealed off from the bottom 13 of the lower part of the valve body.

The bottom 13 of the lower part of the valve body has openings 21 communicating with the outside of the valve body. In the typical embodiment illustrated in the drawings, three such openings 21 are provided. The number of such openings is equal to the number of fluid outlets 17 and they are alined therewith. As shown, they are positioned in registry with the fluid outlets 17. Stems 22, with operating handles 23 on their outer ends, are threadingly engaged and mounted on the bottom 13 to extend through the openings with their inner ends closely adjacent the diaphragm 20. Preferably, because of further saving in expense by facilitating the injection molding of the parts, FIGURE 3 of the drawings illustrates a threaded engagement mounting in which the stem 22 is threaded to engage a brass sleeve 24 which in turn is positioned within the opening 21 in fixed engagement with the bottom 13. With this threaded engagement type mounting, rotation of the operating handle 23 will adjust the position of the stem 22 to cause the stem 22 to move upwardly or downwardly, as will be understood, to engage the diaphragm 20. Continued rotation of the operating handle to move the stem upwardly causes the inner end of the stem to deform the closely adjacent portion of the diaphragm 20, the deformation of the diaphragm 20 occurring upwardly as illustrated in the drawings.

In assembling the complete device, the diaphragm 20 is first placed adjacent the bottom 13 of the lower part of the valve body, the upper part of the valve body is then inserted between the side walls 14 until the side walls 12 tightly engage the diaphragm 20. The upper portions 14a of the side walls 14 of the lower part are provided with tapering edges and these are then crimped inwardly to snugly retain the upper part of the valve body in sealing contact with the diaphragm element 20, as shown in FIGURE 3. Both parts of the valve body are made of polystyrene or similar moldable plastic materials, so that the upper portions 14a of side walls 14 can be swedged, i.e. flowed, during the crimping as in a heat sealing operation.

In the preferred illustration of the embodiment shown in the drawings, the upper surface of the diaphragm element 20 has local circular projections 25 extending upwardly towards the fluid orifice outlets 17, and the top 11 of the upper part of the valve body has small bosses surrounding the inner ends of the fluid outlet orifices 17 extending downwardly with complementary surfaces to receive the projections 25. In addition, the outside of the upper part of the valve body has upwardly extending nibs surrounding the fluid outlet orifices 17 and the fluid inlet orifice 18. Hoses 26 are mounted on these nibs, the hose mounted on the fluid inlet being connected to the source of fluid and the hose is mounted on the fluid outlet orifices in nibs being mounted to the spaces where it is desired to apply fluid, as will be understood.

For convenience in mounting the device of the invention on a typical home aquarium tank, the valve body is provided with an L-shaped hanging clamp 27 extending from one side thereof and two downwardly extending feet 28 on the same side, the feet 28 extending parallel to the base of the L-shaped clamp. FIGURE 1 illustrates the device mounted on such a tank. Clamp 27 rests on the typical metal frame 29 of the tank, with feet 28 engaging the side elements of frame 29, as will be understood. Frame 29 holds the glass 30 of the tank in place, as will also be understood.

In operation of the assembled device, the operator attaches the hose 26 leading to the chamber inlet 18 to the source of the fluid to be controlled by the valve. Assuming that it is desired to discharge air into the aquarium tank through all outlets 17 of the valve except middle outlet 17, the operator rotates handle 23 of the middle stem 22 clockwise so as to adjust the stem 22 upwardly. Movement of the middle stem 22 upwardly causes its inner end to engage the under surface of diaphragm element 20. Continued upward movement of the stem 22 causes the inner end of the stem to deform the diaphragm element 20 thereby raising its local projection 25 upwardly until the projection 25 engages the boss 31 of the middle fluid outlet 17, thereby closing the outlet. Because the periphery of the ridge 20' of the diaphragm element is snugly and firmly retained in the circumferential recess 19 of the bottom 13 of the lower valve body part, deformation of diaphragm 20 by the middle stem 22 is localized and independent of the remainder of the diaphragm element 20. The remainder of the diaphragm element 20 remains un-deformed (see FIGURE 3) so that the air flows continuously through hose 26, thence through fluid inlet 18 into the fluid chamber, thence passes uninterruptedly over the remainder of the diaphragm, thence out through the other two fluid outlets 17 and through their hoses into the aquarium tank.

When it is desired to shut off passage of air through an outlet other than middle outlet 17, it will be understood from the foregoing that the operator rotates the stem registered with the outlet that he desires to close until the adjacent portion of the diaphragm and its local projection 25 is in sealing engagement with the outlet in question, the other stems 22 being rotated counter-clockwise to remove the inner ends of their stems and the adjacent portions of the diaphragm from sealing engagement with their corresponding and registered outlets 17. The operator may pre-select any one or all of the outlets 17 to be closed or opened. Whatever combination for discharge of air through the outlets is selected, all outlets cooperate with the fluid chamber 16. This fluid chamber 16 being a chamber common to all of the outlets 17 and to the inlet 18, the control of air through one or more outlets is unaffected by the particular setting of the other outlets.

The only operating parts in the illustrated embodiment are the diaphragm element 20 and the stems 22. The diaphragm element 20 has a very long useful life because of the high fatigue limit associated with modern resilient materials, such as polyethylene. The diaphragm element 20 apparently suffers no wear whatsoever. Similarly, the stems 22 and their mountings have substantially no wear since the forces necessary to deform the diaphragm are slight. In addition, any wear of the stem in its threaded mounting 24 is localized below the diaphragm 20, so that no such wear can contribute a leak. For these reasons, continued use of the valve of the invention, even if it produces some slight wear, does not adversely affect the performance of the valve. The valve provides control, without leaks, just as effective after many months of use as when the article is first used.

For most efficient use, the projections 25 are preferably solid, as shown in the drawings, and are made in a demi-hemispherical form.

Although the drawings show three outlets 17 with three stems 22 and only one inlet 18, the device may be modified to include two or more outlets 17 and corresponding stems 22 and the air inlet 18 may be multiplied as desired.

Since various modifications may be made in the typical embodiment of the invention, illustrated by way of example in the drawings and described above, it is understood that the invention is not limited to the details thereof except as expressly stated hereinafter.

We claim:

1. In a home aquarium tank air valve for selectively and independently controlling the passage of air from a single source through a plurality of outlets into the tank, the air valve having a valve body, the valve body comprising a first valve body part having a plane surface with depending side walls and having a plurality of orifices extending through the plane surface parallel to the side walls, a second valve body part having a plane surface and extending side walls to telescopically receive the first valve body part when the first valve body part is inserted within the second valve body part to form an internal air chamber communicating with said orifices, a flat deformable diaphragm interposed between and sealingly engaged with the depending side walls of the first valve body part and the plane surface of the second valve body part to seal said chamber from the plane surface of the second valve body part, said diaphragm being secured at its periphery to at least one of the valve body parts to lie closely adjacent the plane surface of the second valve body part to resist movement of the diaphragm as an entirety, a plurality of openings in the plane surface of the second valve body part communicating the plane surface and the adjacent side of the diaphragm with the outside of the valve body, said number of openings being equal to the number of said orifices and being alined therewith, a stem threadingly engaged with the plane surface of the second valve body part in each opening and with an operating handle on the outside of the valve body and extending through the opening to terminate in an inner end, the threaded mounting permitting adjustment of each stem for movement of the inner end to and from engagement with an adjacent local portion of the diaphragm to deform said local portion of the diaphragm into sealing engagement with its alined orifice, an additional orifice in the plane surface of the first valve body part communicating from the chamber to the outside of the valve body to pass air from the outside of the valve body to the chamber.

2. The subject matter of claim 1 characterized by the fact that the periphery of the diaphragm has a ridge extending toward said opposed wall, and the opposed wall has a peripheral recess to receive and snugly engage said ridge to secure the diaphragm element and resist its movement as an entirety.

3. The subject matter of claim 2 characterized by the fact that the diaphragm has local surfaces projecting towards the outlet orifices which are equal in number to the number of outlet orifices and positioned in registry therewith and the areas of the first-mentioned wall immediately surrounding the outlet orifices have surfaces projecting toward the diaphragm and of configuration complementary to the projecting surfaces of the diaphragm to facilitate sealing engagement of the diaphragm with the outlet orifices.

References Cited in the file of this patent

UNITED STATES PATENTS

| 2,781,780 | Zahradka | Feb. 19, 1957 |
| 2,911,010 | Lamburn | Nov. 3, 1959 |

FOREIGN PATENTS

| 467,027 | France | of 1914 |
| 809,500 | Germany | of 1951 |